(12) United States Patent
Bremer et al.

(10) Patent No.: US 7,022,778 B2
(45) Date of Patent: Apr. 4, 2006

(54) HIGH SOLID COATING COMPOSITIONS

(75) Inventors: Gerhard Bremer, Frechen (DE); Hans-Juergen Gawin, Wuppertal (DE); Hermann Kerber, Wuppertal (DE)

(73) Assignee: E. I. duPont de Nemours and Company, Wilmington, DE (US)

( * ) Notice: Subject to any disclaimer, the term of this patent is extended or adjusted under 35 U.S.C. 154(b) by 274 days.

(21) Appl. No.: 10/716,952

(22) Filed: Nov. 18, 2003

(65) Prior Publication Data

US 2004/0157995 A1   Aug. 12, 2004

Related U.S. Application Data

(60) Provisional application No. 60/432,828, filed on Dec. 12, 2002.

(51) Int. Cl.
*C08F 20/00* (2006.01)

(52) U.S. Cl. .................. 525/450; 525/125; 525/418; 525/471; 525/540

(58) Field of Classification Search .................... None
See application file for complete search history.

(56) References Cited

U.S. PATENT DOCUMENTS

| | | | | |
|---|---|---|---|---|
| 3,959,201 A | * | 5/1976 | Chang | 524/598 |
| 5,336,711 A | * | 8/1994 | Schneider et al. | 524/507 |
| 6,037,404 A | * | 3/2000 | Dahm et al. | 524/590 |
| 6,063,448 A | * | 5/2000 | Duecoffre et al. | 427/407.1 |
| 6,767,987 B1 | * | 7/2004 | Okazaki | 528/310 |

FOREIGN PATENT DOCUMENTS

| | | |
|---|---|---|
| EP | 0 470 461 B1 | 2/1992 |
| EP | 0 531 249 A1 | 4/1992 |
| WO | WO 93/05087 | 3/1993 |
| WO | WO 99/07762 | 2/1999 |

\* cited by examiner

*Primary Examiner*—Jeffrey B. Robertson
(74) *Attorney, Agent, or Firm*—Steven C. Benjamin

(57) ABSTRACT

The invention relates to coating compositions comprising:

A) at least one low molecular weight reactive compound with a molecular weight (Mn) of 300–1,500 g/mol, preferably of 300–1,200 g/mol, with at least one secondary and/or tertiary amino group and at least two hydroxyl groups per molecule, which compound is obtained by reacting A1) at least one hydroxyalkyl ester of an olefinically unsaturated carboxylic acid with 2–12 C atoms in the hydroxyalkyl residue with A2) at least one lactone and with A3) at least one hydroxy-functional alkyl-, cycloalkyl- and/or alkoxyamine with at least one primary and/or secondary amino group per molecule and with 2–10 C atoms per molecule, B) at least one cross-linking agent with functional groups reactive towards active hydrogen and optionally, C) at least one binder with functional groups containing active hydrogen.

12 Claims, No Drawings

US 7,022,778 B2

HIGH SOLID COATING COMPOSITIONS

PRIORITY

This application claims priority from Provisional U.S. Patent Application Ser. No. 60/432,828 filed Dec. 12, 2002, incorporated herein by reference.

FIELD OF THE INVENTION

The invention relates to coating compositions based on a low molecular weight reactive compound with hydroxyl and amino groups, a cross-linking component and optionally, binders with functional groups containing reactive hydrogen. The coating compositions may in particular find application in vehicle and industrial coating.

DESCRIPTION OF RELATED ART

Coating compositions based on hydroxy- and/or amino-functional binders and appropriate cross-linking components, in particular, those prepared from hydroxy-functional binders and polyisocyanate cross-linking agents, have long been known. The coatings obtained from these coating compositions are of high quality with very good resistance to chemicals and solvents and have a high level of optical and mechanical properties. In the light of environmental requirements, it is desired to keep the solvent content in solvent-containing coating compositions as low as possible and to increase the solids content. One known method of complying with such requirements is, for example, to use "reactive diluents" in the coating compositions.

Reactive diluents should here be taken to mean compounds which initially act as a solvent in the coating composition and which, during the cross-linking process, are incorporated into the binder by means of reactive groups. In this manner, it is possible to achieve a considerable reduction in organic solvent content while ensuring the necessary processing viscosity.

EP-A-470 461, for example, accordingly describes coating compositions which consist of a polyisocyanate component and a reactive component, wherein the reactive component is composed of polymeric acrylate polyols and polyester polyols together with a low molecular weight reactive component, a secondary diamine comprising ester groups. The diamine is obtained by reacting 3,3'-dimethyl-4,4'-diaminodicyclohexylmethane with maleic or fumaric acid esters. Disadvantages of this system are, on the one hand, its excessively short pot life and, on the other, the dependency of the properties of the coatings obtained therefrom on the ambient conditions, in particular, relative atmospheric humidity, during application.

Further reactive diluents are described in WO-A-99/07762. These comprise mono- or bicyclic oxazolidines, which are used in coating compositions based on hydroxy-functional resins and polyisocyanate cross-linking agents.

EP-A-531 249 further describes a coating composition prepared from a hydroxy-functional acrylate resin, a polyisocyanate cross-linking agent and an aldimine or ketimine as reactive diluent. Optionally, the aldimines and ketimines may here be used in combination with further reactive diluents, such as, oxazolidines or secondary diamines comprising ester groups.

The disadvantage of the reactive diluents listed in the latter two documents is that the functional groups, which are responsible for the actual cross-linking reaction, are present in blocked form and must first be unblocked by moisture, in general, by atmospheric humidity. This means that initiation of the cross-linking reaction is dependent upon the ambient conditions during application, in particular, relative atmospheric humidity, which, for example in an automotive repair workshop, where an air-conditioned atmosphere is not generally provided, may result in extended curing times and/or non-uniform quality of the resultant coatings. Furthermore, these reactive components must be stored under conditions that strictly exclude water/air.

It is also known to that reactive diluents can be used in water-based coating compositions. EP-A-603 219, for example, discloses coating compositions that contain a polyol component in the form of an aqueous dispersion, a polyisocyanate present therein in emulsified form and, as reactive diluents, di- to tetrahydric alcohols with a molar mass of less than 500, such as, for example, ethylene glycol, propylene glycol, butanediols, polyethylene glycols, polypropylene glycols, glycerol and trimethylolpropane.

In vehicle and industrial coating, when formulating high-solids coating compositions based on binders with functional groups containing active hydrogen and appropriate cross-linking agents and reactive diluents with functional groups containing active hydrogen, there is a requirement that the high-solids coating compositions containing these reactive diluents should combine good reactivity and thus short drying times with a sufficiently long pot life and a uniform level of quality of the coatings should be achieved. As far as possible this combination of properties should be independent of ambient conditions during application, in particular, relative atmospheric humidity.

SUMMARY OF THE INVENTION

The invention relates to coating compositions comprising:
A) at least one low molecular weight reactive compound with a molecular weight (Mn) of 300–1,500 g/mol, preferably of 300–1,200 g/mol, with at least one secondary and/or tertiary amino group and at least two hydroxyl groups per molecule, which compound is obtained by reacting
   A1) at least one hydroxyalkyl ester of an olefinically unsaturated carboxylic acid with 2–12 C atoms in the hydroxyalkyl residue with
   A2) at least one lactone and with
   A3) at least one hydroxy-functional alkyl-, cycloalkyl- and/or alkoxyamine with at least one primary and/or secondary amino group per molecule and with 2–10 C atoms per molecule,
B) at least one cross-linking agent with functional groups reactive towards active hydrogen and optionally,
C) at least one binder with functional groups containing active hydrogen.

DETAILED DESCRIPTION OF THE EMBODIMENTS

The coating compositions according to the invention preferably contain at least one binder with functional groups containing active hydrogen (component C). The coating compositions particularly preferably contain 60–90 wt-% of component A) and 10–40 wt-% of component C), in particular, 70–90 wt-% of component A) and 10–30 wt-% of component C), wherein the weight percentages relate to solids content and the proportions add up to 100 wt-%.

It has surprisingly been found that, by using component A), it is possible to formulate coating compositions with an extremely low solvent content. Typically, a VOC (Volatile Organic Content) of approximately 2.1 lbs/gal. These coating compositions cure rapidly, exhibit an adequate pot life, have excellent properties and are very largely independent of ambient conditions during application, in particular, relative atmospheric humidity.

Component A) of the coating composition, according to the invention, comprises one or more low molecular weight reactive compounds with a secondary and/or tertiary amino group and at least two hydroxyl groups per molecule and a preferred molecular weight (Mn) of 300–1,300 g/mol. Component A) is produced by reacting components A1), A2) and A3).

Component A1) for the production of the reactive component A) comprises hydroxyalkyl esters of olefinically unsaturated carboxylic acids with 2–12, preferably, 2–8 C atoms in the hydroxyalkyl residue. The carboxylic acids may be mono- and/or dicarboxylic acids. Examples of olefinically unsaturated monocarboxylic acids are acrylic acid, methacrylic acid, crotonic acid, isocrotonic acid, vinylacetic acid. Examples of olefinically unsaturated dicarboxylic acids are maleic acid, fumaric acid, tetrahydrophthalic acid. The hydroxyalkyl esters of (meth)acrylic acid are preferably used. Preferred hydroxyalkyl (meth)acrylates may comprise those with primary or secondary hydroxyl groups. The hydroxyalkyl residues preferably contain 2–6 C atoms. Examples of suitable hydroxyalkyl esters with primary hydroxyl groups are hydroxyethyl (meth)acrylate, hydroxypropyl (meth)acrylate, hydroxybutyl (meth)acrylate, hydroxyamyl (meth)acrylate, hydroxyhexyl (meth)acrylate. Examples of suitable hydroxyalkyl esters with secondary hydroxyl groups are 2-hydroxypropyl (meth)acrylate, 2-hydroxybutyl (meth)acrylate, 3-hydroxybutyl (meth)acrylate.

Both here and below, (meth)acrylic is intended to mean acrylic and/or methacrylic.

Component A2) for the production of reactive component A) comprises lactones. Suitable lactones are, for example, those which have 4–12 C atoms in the ring, wherein the rings may also comprise different substituents. Preferred lactones are gamma-butyrolactone, delta-valerolactone, delta-butyrolactone, zeta-enantholactone, epsilon-caprolactone, beta-hydroxy-beta-methyl-delta-valerolactone, lambda-laurolactone, 6-methyl-epsilon-caprolactone, 3-methyl-epsilon-caprolactone, 5-methyl-epsilon-caprolactone, 4-methyl-delta-valerolactone, 3,5-dimethyl-epsilon-caprolactone or mixtures thereof. Epsilon-caprolactone is particularly preferred.

Component A3) for the production of reactive component A) comprises hydroxy-functional alkyl-, cycloalkyl- and/or alkoxyamines with at least one primary and/or secondary amino group, at least two hydroxyl groups and 2–10, preferably 2–6 C atoms per molecule. Component A3) preferably comprises hydroxyalkylmonoamines with a primary or secondary, preferably a primary, amino group. The hydroxyalkylamines may contain one or more hydroxyl groups, preferably, one or two hydroxyl groups. The hydroxyalkylamines may be of a linear or branched structure. Suitable hydroxyalkylamines with a primary amino group are, for example, 2-hydroxyethylamine, 3-hydroxypropylamine, 4-hydroxybutylamine, 6-hydroxyhexylamine, 2-methyl-3-hydroxypropylamine, 2,2-dimethyl-3-hydroxypropylamine, 2-(2-aminoethoxy)ethanol, isopropanolamine. Suitable hydroxyalkylamines with a secondary amino group are, for example, N-methyl-2-hydroxyethylamine, N-ethyl-2-hydroxyethylamine, N-propyl-2-hydroxyethylamine, N-butyl-2-hydroxyethylamine, N-methyl-3-hydroxypropylamine, N-ethyl-3-hydroxypropylamine, N-propyl-3-hydroxypropylamine, N-ethyl-2-hydroxypropylamine, N-butyl-3-hydroxypropylamine, diethanolamine and diisopropanolamine.

Component A) may be produced from components A1), A2) and A3), for example, by initially reacting the hydroxyalkyl esters of olefinically unsaturated carboxylic acids (component A1) with the lactones (component A2). This involves an esterification reaction which proceeds by ring-opening of the lactone. During this reaction, terminal hydroxyl groups are again obtained in the form of the hydroxyalkyl ester groups corresponding to the particular lactone. The reaction of the hydroxyalkyl esters of olefinically unsaturated carboxylic acids with the lactones may, for example, be performed at 80–130° C., optionally, in the presence of catalysts. Catalysts which may, for example, be used are organotin, organobismuth or organozinc compounds. The reaction products obtained in said manner may then be reacted with the hydroxy-functional amines (component A3), wherein further terminal hydroxyl groups are obtained and, depending both upon the hydroxy-functional amine used and upon the equivalent ratio of the reaction partners used, a secondary or tertiary amino group is formed. This reaction may, for example, proceed at temperatures of 20–100C, preferably at temperatures of 40–60° C.

The reaction of the hydroxyalkyl esters of olefinically unsaturated carboxylic acids with the lactones may, however, also proceed after the reaction of the hydroxyalkyl esters of olefinically unsaturated carboxylic acids with the hydroxy-functional amines. It is also possible to react components A1), A2) and A3) together simultaneously in a single-stage process.

Particularly preferably, in each case one mole of a hydroxyalkyl ester of olefinically unsaturated monocarboxylic acids (component A1) and 1–5 moles, preferably, on average 2–3 moles, of a lactone (component A2), in particular an epsilon-caprolactone, are reacted together.

A preferred embodiment of the coating composition, according to the invention, contains as component A) one or more reactive compounds Aa) and/or Ab) of the following general formulae:

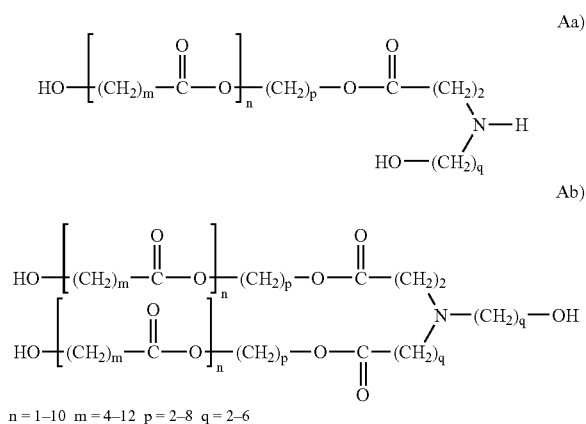

n = 1–10 m = 4–12 p = 2–8 q = 2–6

Preferred components A) contain 5–90 mol % of component Aa) and 95–10 mol % of component Ab), particularly preferably 5–50 mol % of component Aa) and 50–95 mol-% of component Ab). Component A) advantageously assumes the form of a solution in organic solvents, preferably as a 70–90% solution.

In the case of solvent-containing systems, an advantageous development of the present invention consists in partially or completely neutralizing the amino groups of component A) with hydroxycarboxylic acids. In this manner, the pot life of the binder system may be extended relative to the unneutralized variant. The product produced from components A1), A2) and A3) is here further reacted with hydroxycarboxylic acids (component A4) to yield a product Ac) (component Ac=neutralized component A). Examples of hydroxycarboxylic acids are dimethylolpropionic acid and dimethylolbutyric acid.

Component B) of the coating composition, according to the invention, comprises one or more cross-linking agents which are capable of entering into a cross-linking reaction with component A) and the optionally present component C). Cross-linking agents which may be considered are thus compounds with functional groups which are reactive towards functional groups with active hydrogen, in particular towards hydroxyl groups and primary and secondary amino groups. Cross-linking agents which may, in particular, be considered are polyisocyanates with free isocyanate groups or with at least partially blocked isocyanate groups and/or amino resins. Polyisocyanates with free isocyanate groups are preferably used.

The polyisocyanates comprise, for example, any desired organic polyisocyanates having aliphatically, cycloaliphatically, araliphatically and/or aromatically attached free isocyanate groups. The polyisocyanates are liquid at room temperature or liquefied by the addition of organic solvents. The polyisocyanates generally have a viscosity at 23° C. of from 1 to 6,000 mPas, preferably of above 5 and below 3,000 mpas.

Particularly suitable compounds are, for example, so-called "coating polyisocyanates" based on hexamethylene diisocyanate (HDI), 1-isocyanato-3,5,5-trimethyl-5-isocyanatomethylcyclohexane (IPDI) and/or bis(isocyanatocyclohexyl)methane and the per se known derivatives of said diisocyanates comprising biuret, allophanate, urethane and/or isocyanurate groups, from which compounds, after the production thereof, excess starting diisocyanate has been removed, preferably by distillation, down to a residual content of less than 0.5 wt-%. Triisocyanates such as nonanetriisocyanate may also be used.

Sterically hindered polyisocyanates are likewise also suitable. Examples of these are 1,1,6,6-tetramethylhexamethylene diisocyanate, 1,5-dibutylpentamethyl diisocyanate, p- or m-tetramethylxylylene diisocyanate and the corresponding hydrogenated homologues.

Diisocyanates may in principle be reacted in conventional manner to yield more highly functional compounds, for example, by trimerization or by reaction with water or polyols, such as, for example, trimethylolpropane or glycerol.

The polyisocyanates may also be used in the form of isocyanate-modified resins.

The polyisocyanate cross-linking agents may be used individually or in combination.

These comprise the polyisocyanate cross-linking agents conventional in the coatings industry, which are comprehensively described in the literature and are also available as commercial products.

Blocked or partially blocked polyisocyanates may also be used as the cross-linking component. Examples of blocked or partially blocked isocyanates are any desired di- and/or polyisocyanates, in which the isocyanate groups or a proportion of the isocyanate groups have been reacted with compounds which contain active hydrogen. Corresponding prepolymers containing isocyanate groups may also be used as di- and/or polyisocyanates. These comprise, for example, aliphatic, cycloaliphatic, aromatic, optionally also sterically hindered polyisocyanates, as have already been described above. Trifunctional, aromatic and/or aliphatic blocked or partially blocked isocyanates having a number average molecular weight of for example 500–1,500 are preferred. Low molecular weight compounds containing active hydrogen for blocking NCO groups are known. Examples of these are aliphatic or cycloaliphatic alcohols, dialkylaminoalcohols, oximes, lactams, imides, hydroxyalkyl esters, esters of malonic or acetoacetic acid.

Amino resins are likewise suitable as cross-linking agents. These resins are produced in accordance with the prior art and are offered for sale as commercial products by many companies. Examples of such amino resins are amine/formaldehyde condensation resins which are obtained by reacting aldehydes with melamine, guanamine, benzoguanamine or dicyandiamide. The alcohol groups of the aldehyde condensation products are then partially or completely etherified with alcohols.

Component C) of the coating composition according to the invention comprises binders with functional groups containing active hydrogen. The functional groups with active hydrogen, in particular, comprise hydroxyl groups and primary and secondary amino groups. Binders with hydroxyl groups are preferably used as component C). Binders with hydroxyl groups are, for example, the polyesters, polyethers, polyurethanes and (meth)acrylic copolymers known from polyurethane chemistry which may each be used individually or in combination with one another. (Meth)acrylic copolymers containing hydroxyl groups are, however, preferably used as component C).

(Meth)acrylic copolymers containing hydroxyl groups usable as component C) comprise copolymers containing hydroxyl groups of free-radically polymerizable, olefinically unsaturated monomers. The copolymers have, for example, a number average molecular weight (Mn) of 1,500–20,000, preferably of 1,500–10,000 g/mol, a hydroxyl value of 30–200 mg of KOH/g and an acid value of 0–100 mg of KOH/g.

Free-radically polymerizable, olefinically unsaturated monomers which may be used are monomers which, in addition to at least one olefinic double bond, also contain further functional groups and monomers which, apart from at least one olefinic double bond, contain no further functional groups. Further functional groups may be, for example, hydroxyl groups, carboxyl groups, silane groups and epoxy groups.

Monomers with hydroxyl groups are used to introduce hydroxyl groups into the (meth)acrylic copolymers. Suitable hydroxy-functional unsaturated monomers are, for example, hydroxyalkyl esters of alpha,beta-olefinically unsaturated monocarboxylic acids with primary or secondary hydroxyl groups. These may, for example, comprise the hydroxyalkyl esters of acrylic acid, methacrylic acid, crotonic acid and/or isocrotonic acid. The hydroxyalkyl esters of (meth)acrylic acid are preferred. The hydroxyalkyl residues may contain, for example, 2–10 C atoms, preferably 2–6 C atoms. Examples of suitable hydroxyalkyl esters of alpha,beta-olefinically unsaturated monocarboxylic acids with primary hydroxyl groups are hydroxyethyl (meth)acrylate, hydroxypropyl (meth)acrylate, hydroxybutyl (meth)acrylate, hydroxyamyl (meth)acrylate, hydroxyhexyl (meth)acrylate. Examples of suitable hydroxyalkyl esters with secondary hydroxyl groups are 2-hydroxypropyl (meth)acrylate, 2-hydroxybutyl (meth)acrylate, 3-hydroxybutyl (meth)acrylate.

Further usable hydroxy-functional unsaturated monomers are reaction products of alpha,beta-unsaturated monocarboxylic acids with glycidyl esters of saturated monocarboxylic acids branched in alpha position, for example, with glycidyl esters of saturated alpha-alkylalkanemonocarboxylic acids or alpha,alpha'-dialkylalkanemonocarboxylic acids. These preferably comprise the reaction products of (meth) acrylic acid with glycidyl esters of saturated alpha,alpha-dialkylalkanemonocarboxylic acids with 7–13 C atoms per molecule, particularly preferably with 9–11 C atoms per molecule. These reaction products may be formed before, during or after the copolymerization reaction.

Further usable hydroxy-functional unsaturated monomers are reaction products of hydroxyalkyl (meth)acrylates with lactones. Hydroxyalkyl (meth)acrylates which may be used are, for example, those stated above. Suitable lactones are, for example, those which have 3–15 C atoms in the ring, wherein the rings may also comprise different substituents. Preferred lactones are gamma-butyrolactone, delta-valerolactone, epsilon-caprolactone, beta-hydroxy-beta-methyl-delta-valerolactone, lambda-laurolactone or mixtures thereof. Epsilon-caprolactone is particularly preferred. The reaction products preferably comprise those prepared from 1 mole of a hydroxyalkyl ester of an alpha,beta-unsaturated monocarboxylic acid and 1-5 moles, preferably on average 2 moles, of a lactone. The hydroxyl groups of the hydroxyalkyl esters may be modified with the lactone before, during or after performance of the copolymerization reaction.

Suitable unsaturated monomers with carboxyl groups are, for example, olefinically unsaturated monocarboxylic acids, such as, for example, acrylic acid, methacrylic acid, crotonic acid, isocrotonic acid, itaconic acid. Acrylic acid and methacrylic acid are preferably used.

Suitable unsaturated monomers with epoxy groups are, for example, allyl glycidyl ether, 3,4-epoxy-1-vinylcyclohexane, epoxycyclohexyl (meth)acrylate, vinyl glycidyl ether and glycidyl (meth)acrylate. Glycidyl (meth)acrylate is preferably used.

Free-radically polymerizable, olefinically unsaturated monomers which, apart from at least one olefinic double bond, contain no further functional groups are, for example, esters of unsaturated carboxylic acids with aliphatic monohydric branched or unbranched as well as cyclic alcohols with 1–20 C atoms. Unsaturated carboxylic acids which may, for example, be considered are acrylic acid, methacrylic acid, crotonic acid and isocrotonic acid. Esters of (meth)acrylic acid are preferred. Examples of (meth)acrylic acid esters with aliphatic alcohols are methyl acrylate, ethyl acrylate, isopropyl acrylate, tert.-butyl acrylate, n-butyl acrylate, isobutyl acrylate, 2-ethylhexyl acrylate, lauryl acrylate, stearyl acrylate and the corresponding methacrylates. Examples of (meth)acrylic acid esters with cyclic alcohols are cyclohexyl acrylate, trimethylcyclohexyl acrylate, 4-tert.-butylcyclohexyl acrylate, isobornyl acrylate and the corresponding methacrylates.

Further suitable unsaturated monomers without further functional groups are, for example, vinyl ethers, such as isobutyl vinyl ether and vinyl esters, such as for example vinyl acetate, vinyl propionate and vinyl esters of saturated monocarboxylic acids branched in alpha position, for example vinyl esters of saturated alpha,alpha'-dialkylalkanemonocarboxylic acids and vinyl esters of saturated alpha-alkylalkynemonocarboxylic acids in each case having 5–13 carbon atoms, preferably 9–11 carbon atoms, per molecule.

Unsaturated monomers without further functional groups which may readily be used are vinylaromatic hydrocarbons, preferably those with 8–9 C atoms per molecule. Examples of such monomers are styrene, alpha-methylstyrene, chlorostyrenes, 2,5-dimethylstyrene, p-methoxystyrene, vinyltoluenes. Styrene is preferably used.

Small proportions of olefinically polyunsaturated monomers may also be used. These are monomers having at least 2 free-radically polymerizable double bonds per molecule. Examples of these are divinylbenzene, 1,4-butanediol diacrylate, 1,6-hexanediol diacrylate, neopentyl glycol dimethacrylate, glycerol dimethacrylate.

The hydroxy-functional (meth)acrylic copolymers may be produced by free-radical copolymerization. This may proceed in the manner familiar to the person skilled in the art using conventional process, for example bulk, solution or bead polymerization, in particular, by free-radical solution polymerization using free-radical initiators.

Polyesters containing hydroxyl groups which are usable as component C) comprise, for example, those having a number average molecular weight (Mn) of preferably 500–8,000 g/mol, a hydroxyl value of preferably 10–200 mg of KOH/g, particularly preferably of 50–160 mg of KOH/g and an acid value of preferably 0–100 mg of KOH/g. The polyesters may be saturated or unsaturated and they may optionally be modified with fatty acids. The polyesters are produced using known processes with elimination of water from polycarboxylic acids and polyalcohols.

Polycarboxylic acids which are preferably used are dicarboxylic acids or the anhydrides thereof. Examples of dicarboxylic acids and the anhydrides thereof are phthalic acid, isophthalic acid, adipic acid, azelaic acid, sebacic acid, dimerised fatty acid, cyclopentanedicarboxylic acid, maleic acid, maleic anhydride, tetrahydro- and hexahydrophthalic anhydride, succinic anhydride.

Polyalcohols which are preferably used to synthesise the polyesters are diols such as ethylene glycol, propylene glycol, 1,4-butanediol, 1,5-pentanediol, 1,6-hexanediol, 2,2-dimethyl-1,3-propanediol and the hydrogenated bisphenols A and F, and ether alcohols such as diethylene glycols, triethylene glycols, dipropylene glycols, tripropylene glycols. More highly functional polyols such as glycerol, trimethylolethane, trimethylolpropane, pentaerythritol may also be used.

Polyurethanes containing hydroxyl groups which are usable as component C) comprise, for example, those having a number average molecular weight (Mn) of 1,000–100,000, an OH value of 10–200 mg of KOH/g and an acid value of 0–100 mg of KOH/g. The polyurethanes are produced by polyaddition from polyols and polyisocyanates. Any structural units known to the person skilled in the art may be used for the production thereof. Polyols which may, for example, be used are polyether, polyester, polycarbonate, poly(meth)acrylate and polyurethane polyols, preferably such diols. Polyisocyanates which may be considered are any desired organic polyisocyanates known to the person skilled in the art having aliphatically, cycloaliphatically, araliphatically and aromatically attached free isocyanate groups.

If the hydroxy-functional binders usable as component C) are to be used in aqueous coating compositions, they must be converted into a water-dilutable form. This may be achieved in the manner known to the person skilled in the art by ionic and/or nonionic modification of the binders. Anionic and/or nonionic modification is preferred. Anionic modification may, for example, be achieved by incorporating carboxyl groups and at least partially neutralising them. Suitable neutralising agents are basic compounds such as tertiary amines, for example, triethylamine, dimethylethanolamine, diethylethanolamine. Nonionic modification may, for example, be achieved by incorporating polyethylene oxide units. In addition to or instead of the above-stated possibilities, it is also possible to use external emulsifiers in order to ensure the required water-dilutability.

The hydroxy-functional binders may be used individually or in combination with one another.

It is also possible, although less preferred, to use binders containing amino groups, which may optionally also contain hydroxyl groups, as component C) in the coating compositions according to the invention. Such binders may also be used as a mixture with the above-stated binders containing hydroxyl groups.

Components A) and C) and the cross-linking component B) are generally used in such quantity ratios that the equivalent ratio of the groups with active hydrogen from component A) and component C) to the groups of the cross-linking component which are capable of reacting with these groups, amounts, for example, to 5:1–1:5, preferably to 3:1–1:3, particularly preferably to 1.5:1–1:1.5.

The coating compositions according to the invention may be solvent-based or water-based. In the case of solvent-based coating compositions, organic solvents are present. The solvents may originate from the production of the binders or may be added separately. The organic solvents here comprise those known to the person skilled in the art which are typical in coatings. In addition to water, water-based coating compositions may also contain small quantities of organic solvents. The solvents in this case are preferably water-miscible.

The coating compositions according to the invention may contain pigments and/or extenders. Suitable pigments are any colour- and/or special effect-imparting pigments of an organic or inorganic nature which are conventional in coatings. Examples of inorganic or organic colouring pigments are titanium dioxide, micronised titanium dioxide, iron oxide pigments, carbon black, azo pigments, phthalocyanine pigments, quinacridone or pyrrolopyrrole pigments. Examples of special effect pigments are metal pigments, for example, made from aluminium or copper, interference pigments, such as for example titanium dioxide coated aluminium, coated mica, graphite special effect pigments and iron oxide in flake form. Examples of extenders are silicon dioxide, barium sulfate, talcum, aluminium silicate and magnesium silicate.

The coating compositions may contain conventional coating additives. The additives comprise the conventional additives usable in the coatings sector. Examples of such additives are light stabilizers, for example, based on benzotriazoles and HALS (hindered amine light stabilizers) compounds, levelling agents based on (meth)acrylic homopolymers or silicone oils, rheological agents, such as highly disperse silica or polymeric urea compounds, thickeners, such as partially cross-linked polycarboxylic acid or polyurethanes, antifoaming agents, wetting agents, catalysts for the cross-linking reaction of the OH-functional binders, for example organic metal salts, such as, dibutyltin dilaurate, zinc naphthenate and compounds containing tertiary amino groups such as triethylamine for the cross-linking reaction with polyisocyanates. The additives are used in conventional amounts familiar to the person skilled in the art.

In addition to component A), the coating compositions, according to the invention, may contain further reactive low molecular weight compounds as reactive diluents which are capable of reacting with the cross-linking component B). For example, low molecular weight polyhydroxyl compounds, such as, for example, ethylene glycol, propylene glycol, trimethylolpropane and 1,6-dihydroxyhexane may be used.

The coating compositions, according to the invention, may be transparent or pigmented coating compositions. Pigmented coating compositions are preferably produced. Pigmented coating compositions are produced by mixing the individual constituents with one another and homogenizing or grinding them in conventional manner. It is, for example, possible to proceed by initially mixing a proportion of component A) and/or component C) with the pigments and/or extenders and the additives and solvents conventional in coatings and grinding the mixture in grinding units. The ground material is subsequently made up with the remaining quantity of component A) and/or component C).

Depending upon the type of cross-linking agent (component B), single-component or two-component coating compositions may be formulated. If polyisocyanates with free isocyanate groups are, for example, used as the cross-linking agent, the coating compositions are two-component systems, i.e. components A) and C) may be mixed with the polyisocyanate component only shortly before application. If blocked polyisocyanates and/or amino resins are, for example, used as the cross-linking agent, the coating compositions may be formulated as a single component. The coating compositions may, in principle, additionally be adjusted to spraying viscosity with water or organic solvents before being applied.

The coating compositions, according to the invention, are suitable for vehicle and industrial coating. In the context of vehicle coating, the coating compositions may be used both for vehicle original coating and for repair coating of vehicles and vehicle parts. Baking temperatures of 60–160° C., preferably of 100–140° C., are for example used for vehicle original coating. Curing temperatures of 20–80° C., in particular of 20–60° C., are for example used for vehicle repair coating.

The coating compositions, according to the invention, may be applied using known processes, in particular by spray application. Suitable substrates are metal and plastics substrates, in particular, the substrates known in the automotive industry, such as, for example, iron, zinc, aluminium, magnesium, stainless steel or the alloys thereof, together with polyurethanes, polycarbonates or polyolefins.

The coating compositions according to the invention may be formulated as pigmented or transparent coatings. Pigmented formulations are preferred. They may be used for the production of the outer pigmented top coat layer of a multilayer coating and for the production of the filler and/or primer coat of a multilayer coating. The present invention thus also relates to the use of the coating compositions, according to the invention, as top coat coating compositions and as filler and primer coating compositions and to a process for the production of multilayer coatings, wherein, in particular, the pigmented top coat and the filler and primer coats of multilayer coatings are produced by the coating compositions according to the invention.

The coating compositions may be applied as a pigmented top coat layer onto conventional one- or two-component filler layers. The coating compositions according to the invention may, however, also be applied as a filler layer onto optionally pretreated substrates as such or onto conventional primers. The filler layers adhere well to the most varied substrates, such as, for example, bright steel sheet, sanded polyvinyl butyral primer, two-component epoxy primers, keyed original or repair coatings. Overcoating may be performed with solvent-based or water-based coating compositions, for example with pigmented one-layer top coats or with base coats and then with clear coats. The resultant coatings may be cured at room temperature or be forced at higher temperatures, for example, of up to 80° C., preferably, at 40 to 60° C. They may, however, also be cured at higher temperatures of, for example, 80-160° C. Curing temperatures are determined by the area of application and/or the binder/cross-linking agent system used.

At spraying viscosity, the coating compositions, according to the invention, have a content of volatile organic solvents of less than or equal to 2.1 lbs/gal. Use of the reactive component A) in the coating compositions, according to the invention, avoids the disadvantages which arise when known reactive diluents are used. Thus, for example, the pot life of comparable coating compositions containing known reactive diluents may advantageously be extended with the coating compositions, according to the invention. Good quality coatings are obtained independently of the ambient conditions during application, in particular, relative atmospheric humidity.

Further advantages of the coating compositions, according to the invention are achieved if, when formulating the coating compositions, at least a proportion of component Ab) and optionally component Ac) are used. One advantage in this case is that, when formulating aqueous coating compositions, component Ab), which contains tertiary amino groups, may simultaneously act as a basic neutralizing agent for any anionic groups optionally present in the binder C). The neutralizing agent is in this case a reactive neutralizing agent which is involved in the cross-linking process and remains in the coating film after film formation. No volatile amines are released. Component Ab), which contains tertiary amino groups, is preferably used as a neutralizing agent in combination with further basic neutralizing agents. It is, however, also possible to use component Ab), which contains tertiary amino groups, as the sole neutralizing agent. A further advantage of using component Ab) is that, when formulating coating compositions based on hydroxy-functional binders and polyisocyanate cross-linking agents, it is possible to dispense with external catalysts for catalyzing the cross-linking reaction between hydroxyl groups and polyisocyanates, since, as is known, tertiary amino groups catalyze urethane formation. It is, however, also possible to use further catalysts.

The following Examples are intended to illustrate the invention in greater detail.

All parts and percentages are on a weight basis unless otherwise indicated. Molecular weights are determined by gel permeation chromatography using a polystyrene standard.

EXAMPLES

Example 1

Production of a Component A)

100 g of n-butyl acetate, 90 g of 3-amino-1-propanol and 3 g of triethylenediamine are initially introduced into a 2 liter three-necked flask, which is fitted with a stirrer, internal thermometer and reflux condenser, and are heated to 50° C. while being stirred. 786 g of an intermediate product, which has been produced from 255.3 g of hydroxyethyl acrylate, 530.7 g of epsilon-caprolactone, 0.25 g of hydroquinone monomethyl ether and 3 g of a zinc octoate solution (80% in xylene) by stirring for 5 hours at 130° C., are continuously apportioned within 60 minutes.

The temperature is then raised to 60° C. and maintained for 180 minutes. The mixture is then diluted with 120 g of n-butyl acetate. At a non-volatiles content of 80%, the reactive diluent has a viscosity of 109 mPas/25° C. Component A) contains approx. 18 mol % of component Aa) and approx. 82 mol % of component Ab).

Example 2

Production of a Component A)

100 g of n-butyl acetate, 107.3 g of 3-amino-1-propanol and 3 g of triethylenediamine are initially introduced into a 2 liter three-necked flask, which is fitted with a stirrer, internal thermometer and reflux condenser, and are heated to 50° C. while being stirred. 786 g of an intermediate product, which has been produced from 255.3 g of hydroxyethyl acrylate, 530.7 g of epsilon-caprolactone, 0.25 g of hydroquinone monomethyl ether and 3 g of a zinc octoate solution (80% in xylene) by stirring for 5 hours at 130° C., are continuously apportioned within 60 minutes. The temperature is then raised to 60° C. and maintained for 180 minutes. The mixture is then diluted with 124 g of n-butyl acetate. At a non-volatiles content of 80%, the reactive diluent has a viscosity of 153 mPas/25° C. Component A) contains approx. 46 mol % of component Aa) and approx. 54 mol % of component Ab).

Example 3

Production of a Component A)

100 g of n-butyl acetate, 150.2 g of 2-(2-aminoethoxy)ethanol and 3 g of triethylenediamine are initially introduced into a 2 liter three-necked flask, which is fitted with a stirrer, internal thermometer and reflux condenser, and are heated to 50° C. while being stirred. 786 g of an intermediate product, which has been produced from 255.3 g of hydroxyethyl acrylate, 530.7 g of epsilon-caprolactone, 0.25 g of hydroquinone monomethyl ether and 3 g of a zinc octoate solution (80% in xylene) by stirring for 5 hours at 130° C., are continuously apportioned within 60 minutes. The temperature is then raised to 60° C. and maintained for 180 minutes. The mixture is then diluted with 135 g of n-butyl acetate. At a non-volatiles content of 80%, the reactive diluent has a viscosity of 103 mPas/25° C. Component A) contains approx. 46 mol % of component Aa) and approx. 54 mol % of component Ab).

Example 4

Production of a Component Ac)

950 g of the reactive diluent from Example 2) are combined in a 2 liter three-necked flask, which is fitted with a stirrer, internal thermometer and reflux condenser, with 40 g of dimethylolpropionic acid and 10 g of n-butyl acetate, heated to 90° C. and kept at this temperature for 60 minutes. At a non-volatiles content of 80%, the partially neutralized reactive diluent has a viscosity of 290 mPas/25° C.

Example 5

Production of a Component B

A curing agent solution is prepared from 83.5 g of a hexamethylene diisocyanate trimer with an NCO value of approx. 23 and 16.5 g of n-butyl acetate.

Example 6

Production of a Component C)

575 g of solvent naphtha and 150 g of vinyl neodecanoate are initially introduced into a 4 liter three-necked flask, which is fitted with a stirrer, internal thermometer and reflux condenser, and heated to 147° C. while being stirred. A monomer mixture consisting of 82.5 g of styrene, 192.5 g of isobutyl acrylate, 290 g of tert.-butyl acrylate, 195 g of cyclohexyl methacrylate, 565 g of 2-hydroxyethyl methacrylate, 87.5 g of dicumyl peroxide and 62.5 g of tert.-butyl peroxide is continuously apportioned within 360 minutes. The mixture is then post-polymerized for 180 minutes at 147° C. A high-solids acrylate resin is obtained with a non-volatiles content of 64.8%, an OH value of 150 mg of KOH/g and a viscosity of 550 mPas/25° C.

Example 7

Production of a Two-component Clear Coat

The following components are weighed out into a clean, dry container and thoroughly mixed together: 720 g of reactive diluent from Example 2), 180 g of hydroxy-functional acrylate resin from Example 6), 25 g of n-butyl acetate, 59 g of ethoxypropyl acetate, 12 g of a conventional commercial light stabilizer and 4 g of a conventional commercial levelling agent.

Example 8

Production of a Two-component Clear Coat

The following components are weighed out into a clean, dry container and thoroughly mixed together: 720 g of reactive diluent from Example 4), 180 g of hydroxy-functional acrylate resin from Example 6), 25 g of n-butyl acetate, 59 g of ethoxypropyl acetate, 12 g of a conventional commercial light stabilizer and 4 g of a conventional commercial levelling agent.

Example 9

Production of a Two-component Clear Coat (Comparison)

The following components are weighed out into a clean, dry container and thoroughly mixed together: 640 g of aspartic acid ester Desmophen® VP LS 2973 (commercial product of Bayer), 180 g of hydroxy-functional acrylate resin from Example 6), 105 g of n-butyl acetate, 59 g of ethoxypropyl acetate, 12 g of a conventional commercial light stabilizer and 4 g of a conventional commercial levelling agent.

Example 10

Production of a Two-component Clear Coat (Comparison)

The following components are weighed out into a clean, dry container and thoroughly mixed together: 576 g of aspartic acid ester Desmophen® NH 1420 (commercial product of Bayer), 180 g of hydroxy-functional acrylate resin from Example 6), 169 g of n-butyl acetate, 59 g of ethoxypropyl acetate, 12 g of a conventional commercial light stabilizer and 4 g of a conventional commercial levelling agent.

Example 11

Production of a Two-component Top Coat 210 g of hydroxy-functional acrylate resin from Example 6) are thoroughly mixed in a clean, dry container with 25 g of a conventional commercial wetting agent, 15 g of a conventional commercial antisettling agent and 56 g of n-butyl acetate. 352 g of titanium dioxide are then stirred in. The mixture is then dispersed by means of a conventional dispersion process. The formulation is then made up with 342 g of the reactive diluent from Example 2).

Example 12

Production of a Two-component Primer 204 g of the reactive diluent from Example 2) are thoroughly mixed in a clean, dry container with 96 g of n-butyl acetate, 3 g of a conventional commercial wetting agent, 9 g of a conventional commercial antisettling agent, 93 g of titanium dioxide, 81 g of a conventional commercial corrosion protection pigment, 54 g of silica flour, 430 g of dolomite and 15 g of a conventional commercial levelling agent. The mixture is then dispersed by means of a conventional dispersion process, after which it is diluted with 15 g of n-butyl acetate.

Example 13

Production of a Two-component Primer 204 g of the reactive diluent from Example 4) are thoroughly mixed in a clean, dry container with 96 g of n-butyl acetate, 3 g of a conventional commercial wetting agent, 9 g of a conventional commercial antisettling agent, 93 g of titanium dioxide, 81 g of a conventional commercial corrosion protection pigment, 54 g of silica flour, 430 g of dolomite and 15 g of a conventional commercial levelling agent. The mixture is then dispersed by means of a conventional dispersion process, after which it is diluted with 15 g of n-butyl acetate.

The clear coatings prepared above in Examples 7, 8, 9 and 10 are in each case mixed shortly before application with the curing agent solution from Example 5) in a ratio by weight of 2:1. Application is by spraying to a dry film thickness of 40–50 μm using the wet-on-wet process on a solvent-based base coat layer. After a flash-off phase of 5 minutes, the coating film is cured for 30 minutes at 60° C.

The top coat prepared above in Example 11 is mixed shortly before application with the curing agent solution from Example 5) in a ratio by weight of 3:1. Application is by spraying to a dry film thickness of 50–60 pm onto a two-component filler layer. After a flash-off phase of 5 minutes, the coating film is cured for 30 minutes at 60° C.

The primers prepared above in Examples 12 and 13 are mixed shortly before application with the curing agent solution from Example 5) in a ratio by weight of 4:1. Application is by spraying to a dry film thickness of about 150 μm onto steel sheet. After a flash-off phase of 5 minutes, the coating film is cured for 30 minutes at 60° C.

Coating Results

|  | Example: | | | | | | |
| --- | --- | --- | --- | --- | --- | --- | --- |
|  | 7 | 8 | 9 | 10 | 11 | 12 | 13 |
| VOC (lbs/gal) | 2.10 | 2.10 | 2.10 | 2.10 | 2.13 | 2.12 | 2.12 |
| Pot life (min) | 30 | 45 | 20 | <5 | 45 | 60 | 90 |
| Sandable after: (min) | — | — | — | — | — | 180 | 300 |

At comparable contents of volatile organic compounds, a distinctly extended pot life is achieved with the coating formulations, according to the invention.

Pot life: time taken for the initial viscosity of the coating formulation to double.

We claim:

1. A coating composition comprising:
   A) at least one low molecular weight reactive compound with a molecular weight (Mn) of 300–1,500 g/mol with at least one group selected from the group consisting of secondary amino group, tertiary amino group and a mixture thereof and at least two hydroxyl groups per molecule, which compound is obtained by reacting
      A1) at least one hydroxyalkyl ester of an olefinically unsaturated carboxylic acid with 2–12 C atoms in the hydroxyalkyl residue with
      A2) at least one lactone and with
      A3) at least one hydroxy-functional amine having 2–10 carbon atoms per molecule and where the amino group is selected from the group consisting of primary amines, secondary amines and mixtures thereof and the hydroxy-functional amine is selected from the group consisting of hydroxy functional alkyl amines, hydroxy-functional cyclo alkylamines, hydroxy-functional alkoxyamines and any mixtures thereof;
   B) at least one cross-linking agent with functional groups reactive towards active hydrogen and optionally,
   C) at least one binder with functional groups containing active hydrogen.

2. A coating composition according to claim 1, containing 60–90 wt-% of component A) and 10–40 wt-% of component C), wherein the weight percentages relate to solids content and the proportions of component A) and component C) add up to 100 wt-%.

3. A coating composition according to claim 1, containing component C selected from the group consisting of hydroxy-functional poly(meth)acrylates, polyesters, polyurethanes and any mixture thereof.

4. A coating composition according to claim 3 wherein component C comprises hydroxy-functional poly(meth)acrylates.

5. A coating composition according to claim 1, wherein component B comprise polyisocyanates with free isocyanate groups.

6. A coating composition according to claim 1, containing compounds selected from the group consisting of pigments, extenders and mixtures thereof.

7. A coating composition according to claim 1, wherein component A1 comprise hydroxyalkyl esters of (meth)acrylic acid.

8. A coating composition according to claim 1, wherein component A2 comprise epsilon-caprolactone.

9. A coating composition according to claim 1, wherein component A3 comprises hydroxyalkylmonoamines with a primary amino group and one or two hydroxyl groups.

10. A coating composition according to claim 1, wherein the amino groups of component A) are partially or completely neutralized with hydroxycarboxylic acids.

11. A process for the multilayer coating of a substrate to form a multilayer structure thereon comprising applying a coating composition according to claim 1 to form at least one layer of the multilayer structure.

12. A process according to claim 11, wherein the substrate comprises vehicles or vehicle parts.

* * * * *